J. M. HOLLAND.
COMBINED WATER GAGE AND RECORDER.
APPLICATION FILED MAY 7, 1918.
1,300,967.
Patented Apr. 15, 1919.
3 SHEETS—SHEET 1.
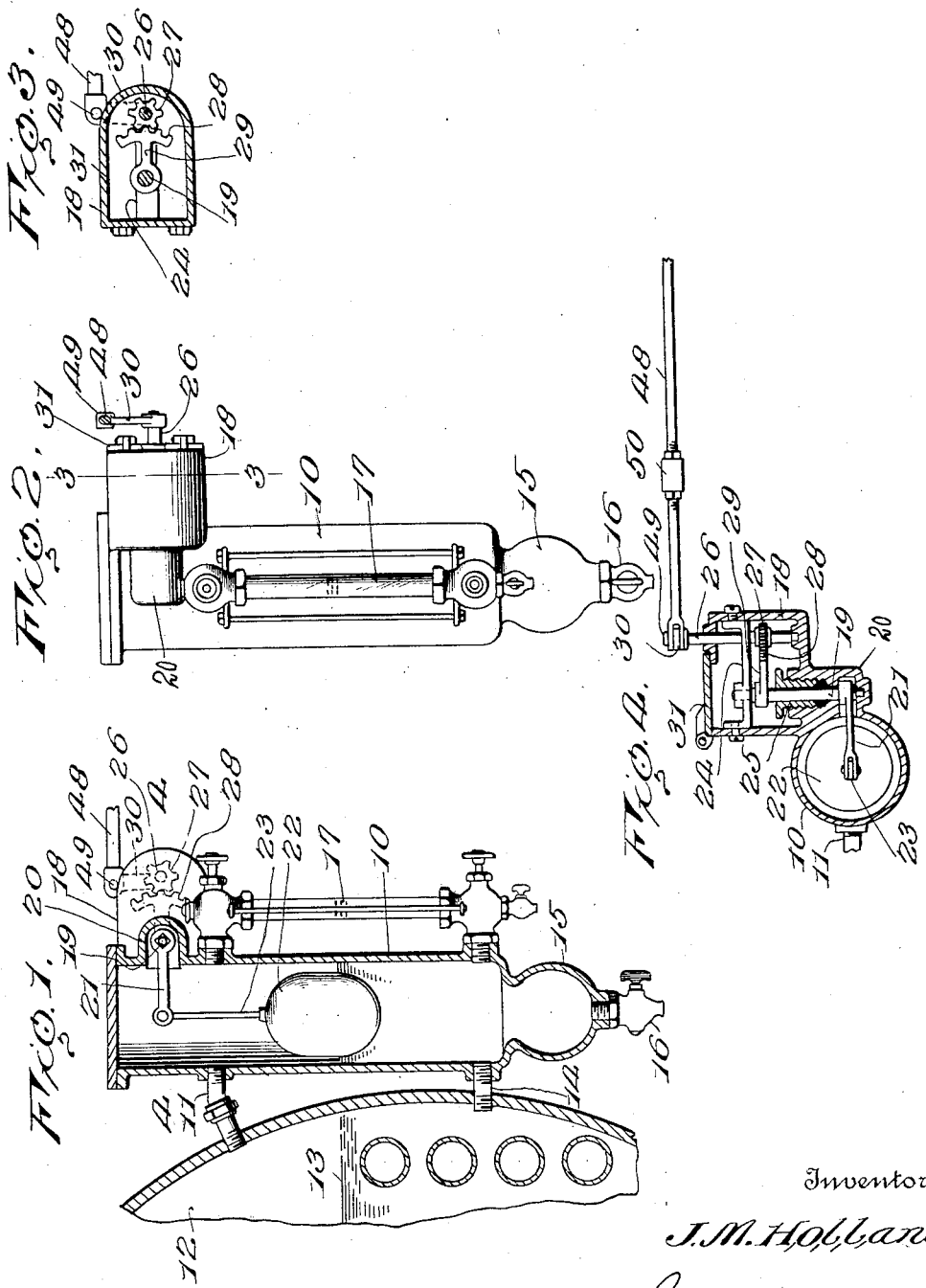

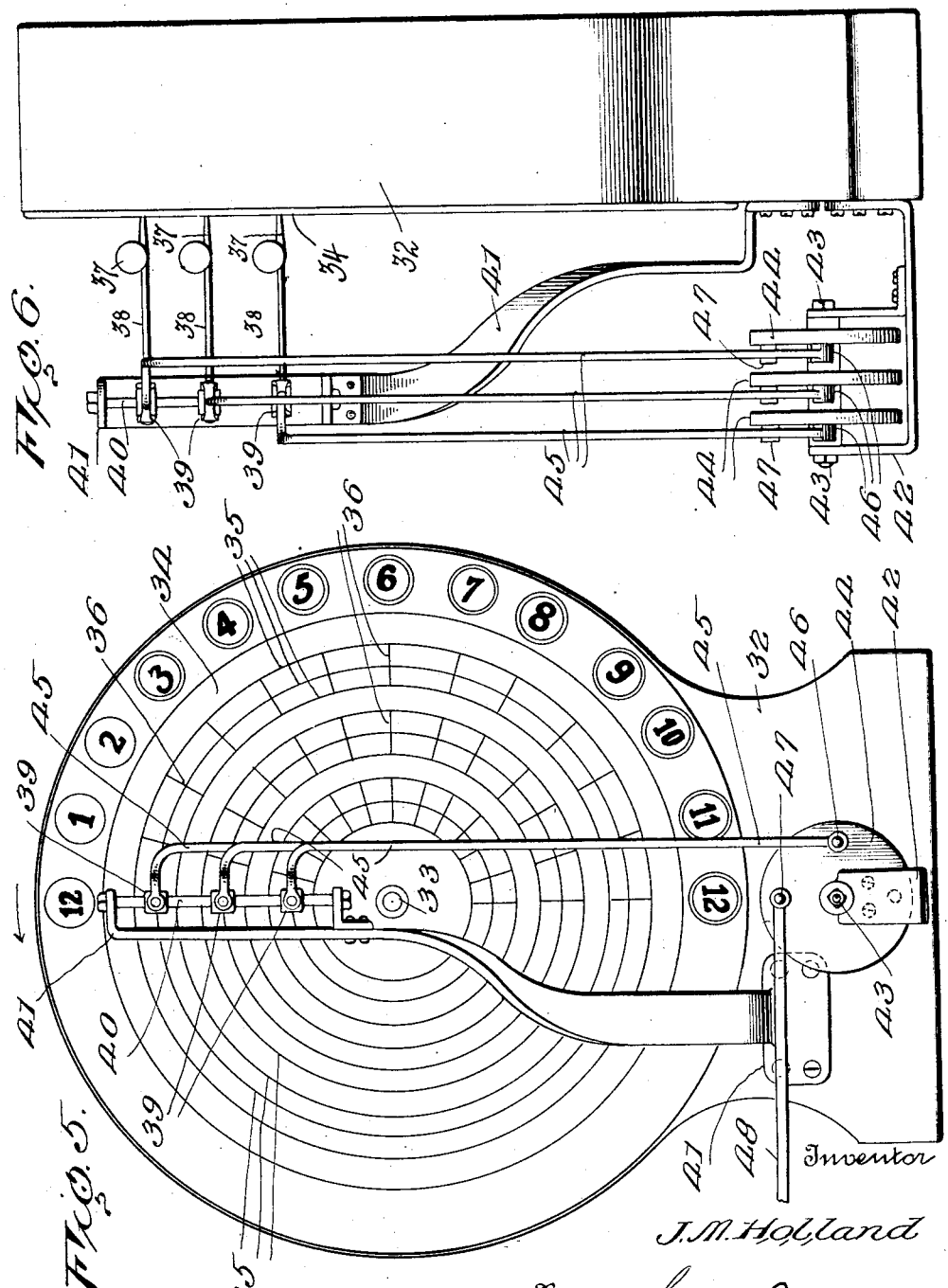

J. M. HOLLAND.
COMBINED WATER GAGE AND RECORDER.
APPLICATION FILED MAY 7, 1918.
1,300,967.
Patented Apr. 15, 1919.
3 SHEETS—SHEET 3.
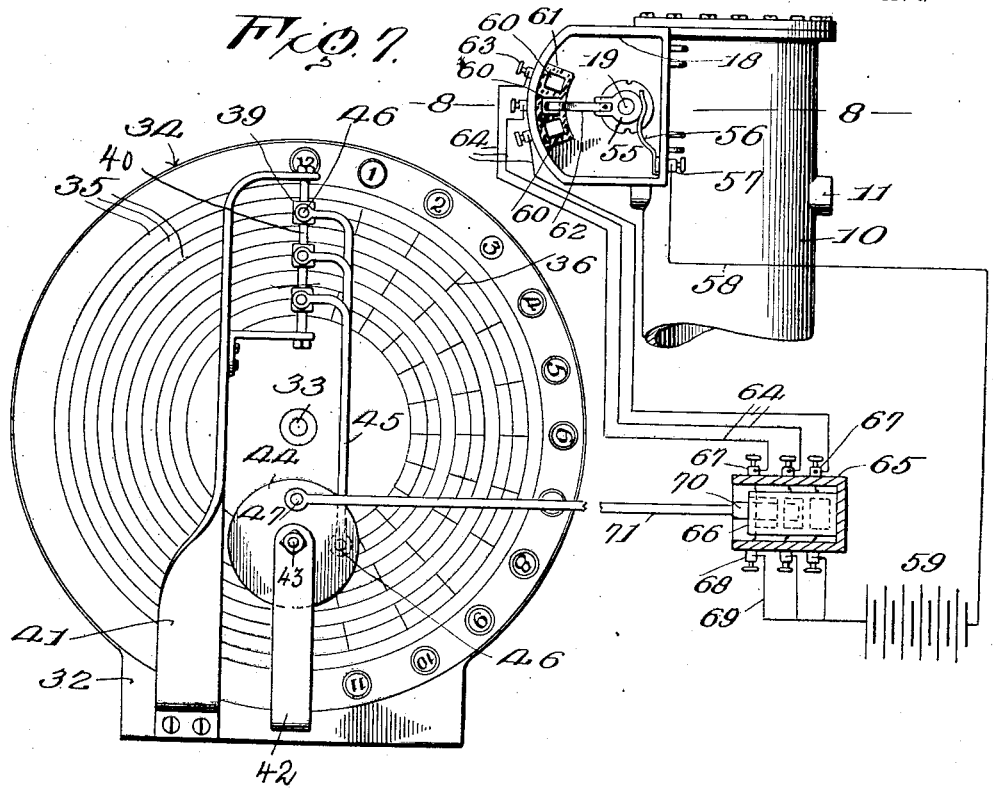
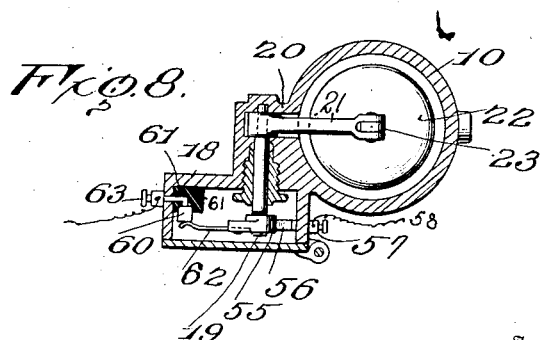
Inventor
James M. Holland
By
_____, Attorneys

UNITED STATES PATENT OFFICE.

JAMES M. HOLLAND, OF TEMPLE, TEXAS.

COMBINED WATER GAGE AND RECORDER.

1,300,967.   Specification of Letters Patent.   Patented Apr. 15, 1919.

Application filed May 7, 1918. Serial No. 233,080.

*To all whom it may concern:*

Be it known that I, JAMES M. HOLLAND, a citizen of the United States, residing at Temple, in the county of Bell and State of Texas, have invented certain new and useful Improvements in Combined Water Gages and Recorders, of which the following is a specification.

This invention relates to combined water gage and recording devices for steam generators, and has for one of its objects to provide a simply constructed device which will denote the stage of water in the generator and automatically denote and record the stage of the water in the generator at different periods of time at any point away from the generator.

Another object of the invention is to provide a device of this character applicable to a plurality of generators and arranged to denote and record the stage of water in each of the generators independently.

With these and other objects in view, the invention consists in certain novel features of construction, as hereinafter shown and described and then specifically pointed out in the claims; and in the drawings illustrative of the preferred embodiment of the invention—

Figure 1 is a vertical sectional view of the improved apparatus.

Fig. 2 is a side view of the device disclosed in Fig. 1.

Fig. 3 is a section on the line 3—3 of Fig. 2.

Fig. 4 is a transverse section on the line 4—4 of Fig. 1.

Fig. 5 is a front elevation of the recording dial mechanism,

Fig. 6 is a side elevation of the parts shown in Fig. 5,

Fig. 7 is a view partly in section illustrating one means of operating the recording device electrically, Fig. 8 is a section on the line 8—8 of Fig. 7.

The improved device includes a casing for a float, connected to the generator above and below the water line, and preferably provided with a sight gage, to denote the stage of water. Connected to the float is a movable member operative by the rising and falling of the float, a dial rotative once in a certain predetermined period of time by suitable clock-work, a scribing implement coacting with the dial and connecting means between the float operated mechanism and the scribing instrument whereby the rising and falling of the float caused by the change of water level in the generator will make a permanent record upon the rotating dial. By this means the stage of water in the generator is denoted and recorded at certain predetermined intervals. The dial is preferably located in the office of the plant in which the generator is installed and is accessible only to authorized persons, so that a check can be maintained upon the operations of the fireman. The apparatus employed to produce the desired results comprises a casing 10 connected at 11 near its upper part to the generator, a portion of which is indicated at 12, above the water line indicated at 13, and connected at 14 near its lower end to the generator below the water line. At its lower end the casing 10 is extended into a settling chamber 15 provided with a draw-off valve 16. A sight gage of the usual construction is connected to the casing 10 and includes a transparent tube 17. The water level in the generator, in the casing 10, and in the tubular member 17 stand at a constant uniform level as will be understood.

Formed upon the upper portion of the casing 10 at one side is a chamber or extension 18 in which a shaft 19 is mounted for rotation. At one end the shaft 19 extends through a smaller chamber 20 and supports an arm 21 which extends into the interior of the casing 10. A float 22 is disposed within the casing 10 and connected to the arm 21 by a rod 23. By this means the float operates to oscillate the shaft 19 as the float is moved upwardly and downwardly by changes in the stage of the water in the generator. Disposed within the chamber 18 is a transverse support 24 supporting the shaft 19. The chamber 18 is provided with a suitable stuffing box 25 coacting with the shaft 19 to prevent the steam within the casing 10 from passing into the chamber 18.

Mounted for operation within the chamber 18 is another shaft 26 supported by the bracket member 24 and suitable seats and bearings in the walls of the chamber 18. The shaft 26 is provided with a pinion 27 which is engaged by a gear segment 28 on an arm 29 carried by the shaft 19. By this arrangement when the shaft 19 is oscillated the shaft 26 will be correspondingly oscillated. Connected to the free end of the shaft 26 is an arm 30. A door 31 forms a closure for one side of the chamber 18 to render the mechanism in the chamber readily accessible.

Located at any suitable point away from the casing 10 and its attachments is another casing 32 adapted to inclose suitable clockwork mechanism, the clock-work mechanism including a main shaft or journal 33, and connected to the journal and rotative therewith is a disk or dial device indicated as a whole at 34. The dial 34 is large enough to contain a plurality of concentric lines arranged in groups or series, one for each generator with which the device is associated and corresponding to the various stages of water in the generators. Generally three lines will be employed in each group, a central line to denote the normal stage of water in the generator, a second line to denote the low water stage, and a third line to denote the high water stage. One group of the concentric lines will be employed in connection with each generator of the plant where a plurality of generators are employed, but if one generator only is used, then the dial will be provided with one group only of the concentric lines. For the purpose of illustration the dial in Fig. 5 is shown provided with three groups of the lines concentric with the center of the shaft 33 of the clock-work mechanism and denoting that three generators are associated with the recording apparatus as shown. If a period of twenty-four hours is to be recorded then the groups of lines will be provided with twenty-four lines radiating from the shaft 33, but if a period of twelve hours only is to be recorded one-half of the dial only will be provided with the radial lines as shown in Fig. 5 and numbered as shown. The concentric lines are indicated by the character 35, and the radial lines by the character 36, and radial lines of all the groups being in alinement radially of the dial, as shown. The dial 34 is made to rotate from left to right as indicated by the arrow.

Each group of concentric lines will be provided with a suitable recording pen device indicated at 37, each pen being connected to a suitable stock 38 leading to and connected to a block device 39 slidable upon a vertical guide rod or shaft 40. The pin is supported from the casing 32 of the clock mechanism by a bracket 41 of suitable construction. The rod 40 will be of sufficient length to enable the blocks 39 to be moved independently to a sufficient extent to enable the scribing pens or other implements associated therewith to travel over the groups of the concentric lines without interference one with the other. Suitably supported from the clock casing 32, for instance by a bracket 42, is a shaft 43 carrying a plurality of disks or plates 44, one for each of the generators, and one of the scribing implements. Connected to each of the movable block devices 39 is a rod 45, each rod leading to and being pivoted at 46 to one of the disks or plates 44. Pivoted at 47 to each of the disks 44 is a rod 48, each rod being pivoted at 49 to the arm 30 of the adjacent shaft 26. Each of the rods 48 is preferably provided with an adjusting collar one of which is indicated at 50, to enable the length of the rod to be adjusted. It will be understood that each of the generators is provided with one of the casings 10 and its attachments, and each casing associated with one of the rods 48 leading to one of the scriber actuating devices, but that one only of the float casings and its attachments are shown for illustration.

With a device thus constructed and connected the operation will be obvious. If the water in the generator remains at a uniform stage, the float 22 will be correspondingly maintained at its central or intermediate position and hold the scribing implement associated therewith constantly upon the central concentric line of its corresponding group upon the rotating dial, the scribing implement thus recording a constant line upon the surface of the dial. If the stage of water varies the scribing implement will be correspondingly varied in position and record an eccentric or zigzag line upon the dial, and the extent of the irregularity of the line thus formed will make an accurate and permanent illustration of the stage of water at various periods of time during which the dial is rotated.

In Figs. 7 and 8 the device is shown arranged to be actuated electrically, and in this structure the shaft 19 is provided within the casing or chamber 18 with a contact sleeve 55 suitably insulated from the shaft 19 and with which a resilient "brush" device 56 is in constant contact. The contact member 56 is coupled to the casing 18 by a binder post 57 from which a conductor wire 58 leads to one pole of a battery or other source of electrical energy, indicated at 59. Disposed within the chamber 18 are a plurality of contact plates 60 in spaced relation and insulated from the casing as shown at 61. The contacts 60 are disposed in segmental order, and movable over the contacts is a contact arm 62, the latter contacting with the member 55. By this arrangement as the shaft 19 is oscillated through the influence of the float 22, the contact arm 62 will be alternately moved into contact with the plates 60. Each of the plates 60 is connected to a binder post 63 from which conductor wires 64 lead as shown in Fig. 7. Suitably supported at some convenient point is a casing 65 having a solenoid magnet indicated at 66 disposed therein. The casing 65 is provided at one side with a plurality of binder posts 67 with which the conductors 64 are connected as shown. Attached to the casing 65 are other binder posts 68 from which conductor wires 69 lead to the other pole of the battery 59. The armature of the solenoid is represented at 70, and leading from the solenoid armature is a rod 71 which performs the same function as the rod 48 shown in Figs. 1 to 4. The dial and the recording needle mechanism employed in the modified structure disclosed in Figs. 7 and 8 are substantially the same as that shown in Figs. 1 to 4, and corresponding designating characters are employed for the like portions of the device.

It will be obvious by this arrangement that when the float 22 is in normal position the contact member 62 will be held in contact with the center plate 60 and hold the solenoid armature 70 in a corresponding central position, and retain the needle actuating mechanism in position to produce a concentric line upon the movable dial. If the water level falls in the generator the float will fall correspondingly and move the contact arm 62 into engagement with the upper contact plate 60 and thus cause the solenoid armature to be correspondingly moved and likewise correspondingly actuate the recording needle and cause it to move toward the outer line of the group of concentric lines on the dial with which it is associated. The mechanism illustrated in Figs. 7 and 8 will thus produce precisely the same results as the mechanism shown in Figs. 1 to 4, and accurately record the fluctuations of the water level upon the dial.

The recording devices will generally be located at a distance from the generator, for instance in the office of the manager or superintendent of the plant in which the generators are located, who is thus kept informed of the condition of the generators at all times, and furnished day by day with a complete and permanent record of the same.

Having thus described the invention, what is claimed as new is:

1. The combination with a casing including a float, of a recording dial, a bracket arranged near the dial, a substantially vertical shaft carried by the bracket, a substantially horizontal shaft arranged near the dial, a disk carried by the horizontal shaft, a block slidably mounted on the vertical shaft, a scribing device extending laterally from the block and movable over the face of the dial, a rod having one end thereof connected with the block and its other end pivotally connected with the disk, and a second rod having one end thereof pivotally connected with said disk and its other end operatively connected with the float for actuating the scribing device as the float rises and falls within the casing.

2. The combination with a casing including a float, of an auxiliary casing, clock mechanism disposed in the auxiliary casing, a recording dial actuated by the clock mechanism, a bracket secured to the auxiliary casing and provided with laterally extending arms, a vertical shaft supported between said arms, a second bracket secured to the auxiliary casing, a horizontal shaft journaled in said second bracket, a disk carried by the horizontal shaft, a block slidably mounted on the vertical shaft, a scribing device carried by the block and movable over the face of the dial, a rod having one end thereof connected with the block and its other end pivotally connected with the disk, and a connection between said disk and the float whereby the movement of the float will cause the scribing device to travel over the face of the dial.

3. The combination with a casing including a float, of a recording device, a bracket arranged near the recording device, a substantially vertical shaft carried by the bracket, a substantially horizontal shaft arranged near the recording device, a block slidably mounted on the vertical shaft, a scribing device extending laterally from the block and movable over the face of the recording device, a rod having one end thereof connected with the block, a second rod having one end thereof operatively connected with the float, and means mounted on the horizontal shaft and operatively connected with the adjacent ends of said rods whereby the scribing device will be actuated as the float rises and falls within the casing.

In testimony whereof I affix my signature.

JAMES M. HOLLAND. [L. S.]

Copies of this patent may be obtained for five cents each, by addressing the "Commissioner of Patents, Washington, D. C."